US006769294B2

(12) United States Patent
Yurjevich et al.

(10) Patent No.: US 6,769,294 B2
(45) Date of Patent: Aug. 3, 2004

(54) METHOD OF DETERMINING POTENTIAL CAUSE OF TIRE FAILURE BY MEASURING THE TIRE TEMPERATURE ACHIEVED DURING OPERATING CONDITIONS

(75) Inventors: Martin A. Yurjevich, North Canton, OH (US); James M. Kirby, Akron, OH (US); Charles D. Spragg, Hudson, OH (US); Andrew K. Reinhart, Akron, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 304 days.

(21) Appl. No.: 09/948,894

(22) Filed: Sep. 7, 2001

(65) Prior Publication Data

US 2003/0047264 A1 Mar. 13, 2003

(51) Int. Cl.[7] .............................................. G01F 17/00
(52) U.S. Cl. ........................................ 73/146; 340/449
(58) Field of Search ............................... 73/146–146.8; 340/442–449

(56) References Cited

U.S. PATENT DOCUMENTS

| | | |
|---|---|---|
| 3,002,385 A | 10/1961 | Wahl et al. |
| 3,233,647 A | 2/1966 | Newell |
| 3,415,122 A | 12/1968 | Yee |
| 3,802,269 A | 4/1974 | Cooper |
| 3,805,864 A | 4/1974 | Tsuruta |
| 3,807,226 A | 4/1974 | Williams |
| 3,814,160 A | 6/1974 | Creasey |
| 3,875,558 A | 4/1975 | Samples |
| 3,922,917 A | 12/1975 | Ayres |
| 4,090,546 A | 5/1978 | Honda et al. |
| 4,150,567 A | 4/1979 | Prevorsek et al. |
| 4,318,436 A | 3/1982 | Shurman |
| 4,334,215 A | 6/1982 | Frazier et al. |
| 4,459,046 A | 7/1984 | Spirg |
| 5,055,245 A | 10/1991 | Hisatomi et al. |
| 5,099,688 A | 3/1992 | de Mars |
| 5,231,391 A | 7/1993 | Rigaux |
| H1283 H | 2/1994 | Porto et al. |
| 5,500,065 A | 3/1996 | Koch et al. |
| 5,520,231 A | 5/1996 | Myatt |
| 5,562,787 A | 10/1996 | Koch et al. |
| 5,573,610 A | 11/1996 | Koch et al. |
| 5,573,611 A | 11/1996 | Koch et al. |
| 5,731,754 A | 3/1998 | Lee, Jr. et al. |
| 5,824,170 A | 10/1998 | Weston et al. |
| 5,960,844 A | 10/1999 | Hamaya |
| 5,962,778 A | 10/1999 | Billieres |
| 5,971,046 A | 10/1999 | Koch et al. |
| 5,977,870 A * | 11/1999 | Rensel et al. ............... 340/447 |
| 6,030,478 A | 2/2000 | Koch et al. |
| 6,131,633 A | 10/2000 | Slivka |

FOREIGN PATENT DOCUMENTS

| | | | |
|---|---|---|---|
| DE | 877 263 | 5/1953 | |
| DE | 199 24 830 | 11/2000 | |
| EP | 1 006 010 | 6/2000 | |
| JP | 2000-75794 | * 3/2000 | ............. G09F/3/02 |
| WO | WO 01/25034 | 4/2001 | |

* cited by examiner

*Primary Examiner*—Edward Lefkowitz
*Assistant Examiner*—Jermaine Jenkins
(74) *Attorney, Agent, or Firm*—Michael Sand; Michael R. Huber

(57) ABSTRACT

The invention provides a tire and a method for analyzing the temperature exposure to the tire. The tire and the method allow an investigator to determine the maximum temperature the tire experienced during its operation. This information offers a potential cause for the tire failure by allowing the investigator to determine a maximum temperature experienced by an area of the tire by reviewing a non-reversible, temperature-indicating label positioned at a location in the tire. The information may be used to identify a potential cause of a tire failure after the failure has occurred. The information may also be used to identify a damaged tire before the tire fails.

34 Claims, 5 Drawing Sheets

METHOD OF DETERMINING POTENTIAL CAUSE OF TIRE FAILURE BY MEASURING THE TIRE TEMPERATURE ACHIEVED DURING OPERATING CONDITIONS

BACKGROUND OF THE INVENTION

1. Technical Field

The invention relates to a method for determining the temperature experienced by the tire during operating conditions. The invention also relates to a tire having a monitoring device that allows an investigator to identify a maximum temperature seen by the inside surface of the tire. This temperature may be one obtained during proper operating conditions or a temperature obtained during less than proper operating conditions. Specifically, the invention relates to a method of using a non-reversible, temperature-indicating label on a tire to allow an investigator to determine the maximum temperature experienced by the tire. This information helps the investigator identify a potential cause of a tire failure or helps the investigator identify tires that may fail in the future.

2. Background Information

Pneumatic vehicle tires fail for a wide variety of reasons. Some reasons, such as cuts or punctures, are fairly easy to detect while other reasons are not so easy to detect. Investigators who attempt to identify the reason for tire failure desire an indicator that reveals additional information related to the service conditions that may have caused or may have contributed to the failure. Tire investigators also desire indicators that may help identify a tire that will fail in the future.

Those skilled in the tire art recognize that a tire exposed to excessive heat has a higher risk of failure because the excessive heat can harm rubber components and adhesion between components within the tire. Excessive heat can be generated in a tire, for example, when the tire deflects excessively, when the tire is improperly inflated, and/or if the tire is improperly loaded. Tire investigators desire an indicator associated with the tire that would reveal excessive temperatures experienced by the tire.

BRIEF SUMMARY OF THE INVENTION

The invention provides a method for identifying a potential cause of a tire failure by providing an investigator a mechanism for reviewing the temperature experienced by the tire during its use. The method includes the step of utilizing a non-reversible, temperature-indicating label on a portion of the tire and reviewing the highest temperature experienced by the tire. The invention also allows an investigator to review a tire that is in operation to determine if the tire has been exposed to excessive temperatures that could have damaged the tire.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
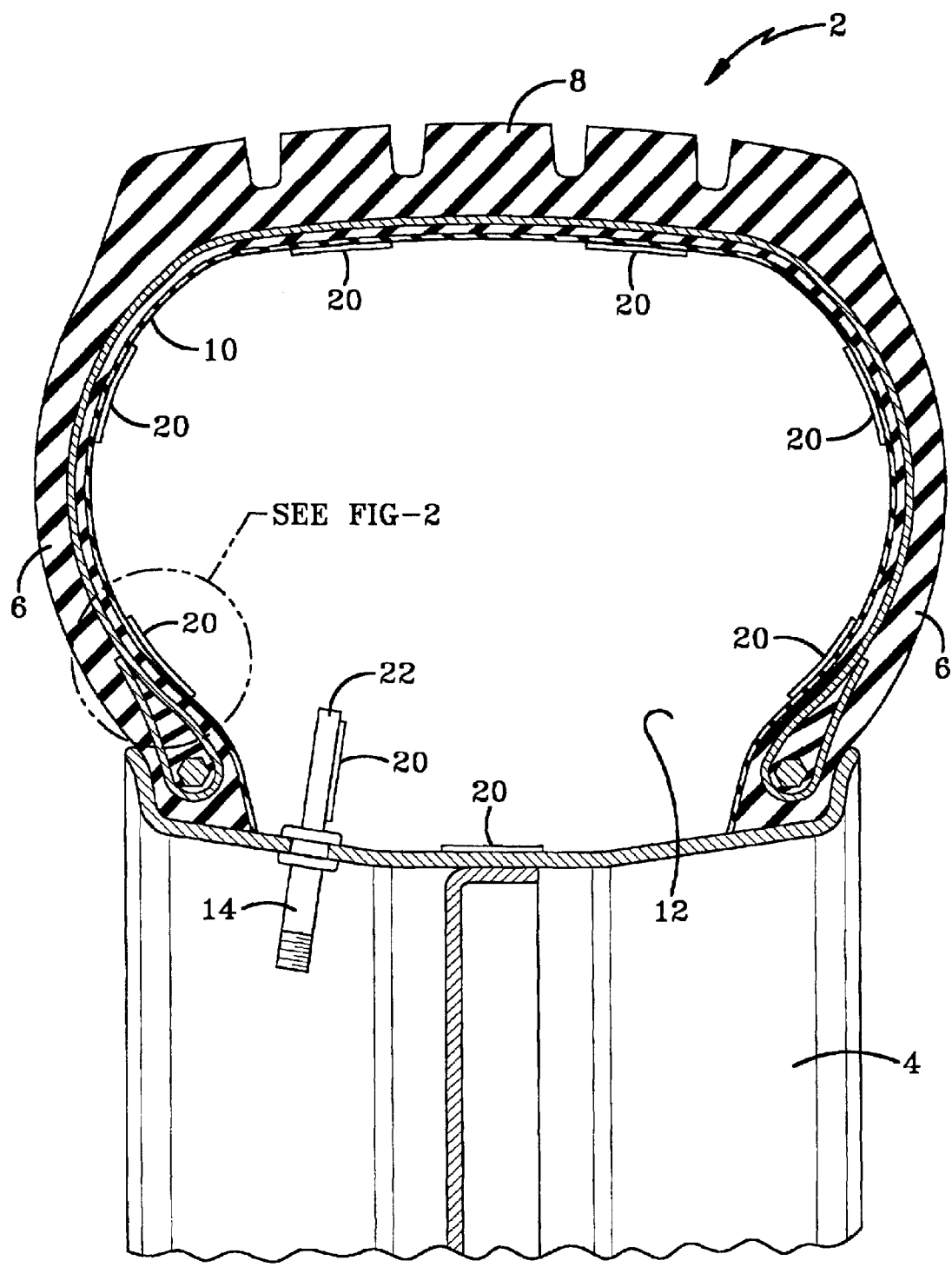
FIG. 1 is a cross sectional view of a pneumatic tire mounted on a tire rim with a tire valve extending through the rim.
Figure 2:
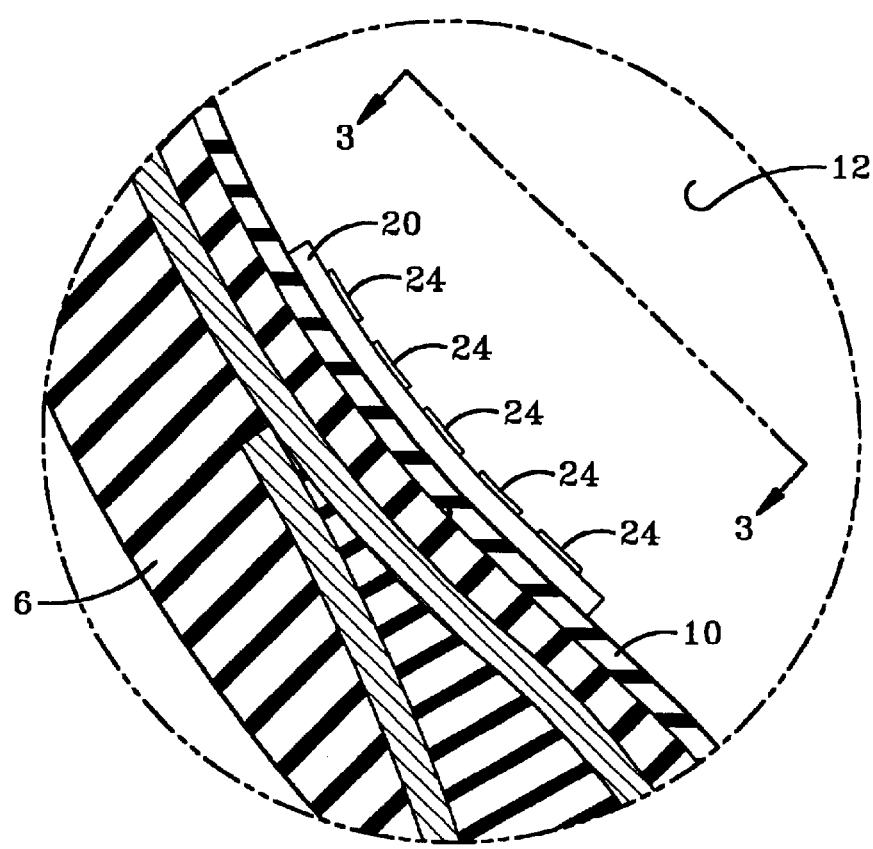
FIG. 2 is an enlarged view of the encircled portion of FIG. 1.

The method of the invention is performed with the tire 2 depicted in FIG. 1. Tire 2 is a typical pneumatic tire that is mounted on a rim 4. Tire 2 has sidewalls 6 and a tread portion 8. Tire 2 has an inner surface 10 that faces the pneumatic chamber 12 of tire 2. Rim 4 includes a valve 14 that allows air to be delivered to pneumatic chamber 12.

In FIG. 1, at least one non-reversible, temperature-indicating label 20 is connected to inner surface 10 of tire 2. Label 20 may be attached to tire 2 at a variety of different locations such as the six locations along inner surface 10 depicted in FIG. 1. These locations include a position adjacent to the bead ring of the tire, in the lower portion of the sidewall of the tire, in the upper portion of the sidewall of the tire, any position along the crown or tread portion of the tire, and the locations along the other sidewall of the tire. When a tire-monitoring device 22 is connected to rim 4 or valve 14, label 20 may be mounted directly to sensor 22 as shown in FIG. 1. Label 20 may also be connected directly to rim 4. When label 20 is connected to rim 4, label 20 will only register the temperature of chamber 12 and rim 4.

Figure 3:
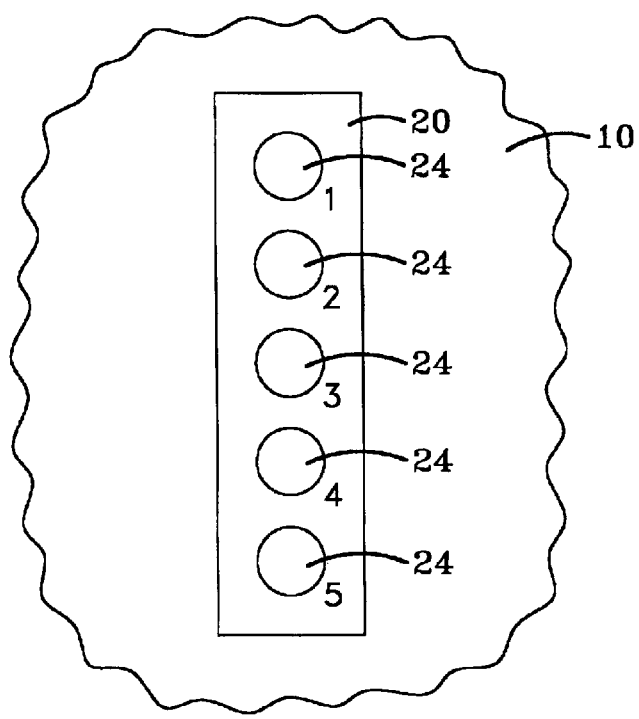
FIG. 3 is a view taken along line 3—3 of FIG. 2.

Label 20 may be any of a variety of different types of non-reversible, temperature-indicating labels known in the art. One such label includes an indicator area or patch 24 that changes colors at a rated temperature or rated temperature range. These labels are available in a variety of configurations and temperature ranges. One source for these labels is Omega® Engineering, Inc. For instance, label 20 depicted in FIG. 3 includes areas 24(1)–24(5) with area 24(1) indicating a lower temperature than area 24(2) that indicates a lower temperature than area 24(3), etc. Areas 24 are not reversible so that area 24 will change when it experiences its rated temperature and will not change back when the temperature drops below the rated temperature. Each area 24 may indicate a minimum temperature or a range of temperatures depending on the desired accuracy of the system. The rated temperatures or temperature ranges are preferably in the range of temperatures where a pneumatic tire experiences damage. In general, the range would include temperatures that exceed the normal operating temperatures of a properly inflated and properly loaded tire. Such a range may be determined by conducting lab tests. It is expected that the range may vary depending on tire size, construction, and application. A person reviewing label 20 can thus readily determine the highest temperature experienced by label 20 and the area of tire 2 where label 20 is located when the person reviews tire 2 after tire 2 fails.

The person reviewing label 20 may also review label 20 during routine tire maintenance to determine if tire 2 has been subjected to excessive heat during reported normal operation. If label 20 indicates that tire 2 has been exposed to excessive heat, the person can discontinue use of the tire or perform further tests to determine if the tire is still usable. Each tire has a maximum acceptable temperature for a given label location. This temperature is determined through known laboratory testing. If label 20 indicates a temperature higher than the maximum acceptable temperature, the investigator would remove the tire from operation.

Figure 4:
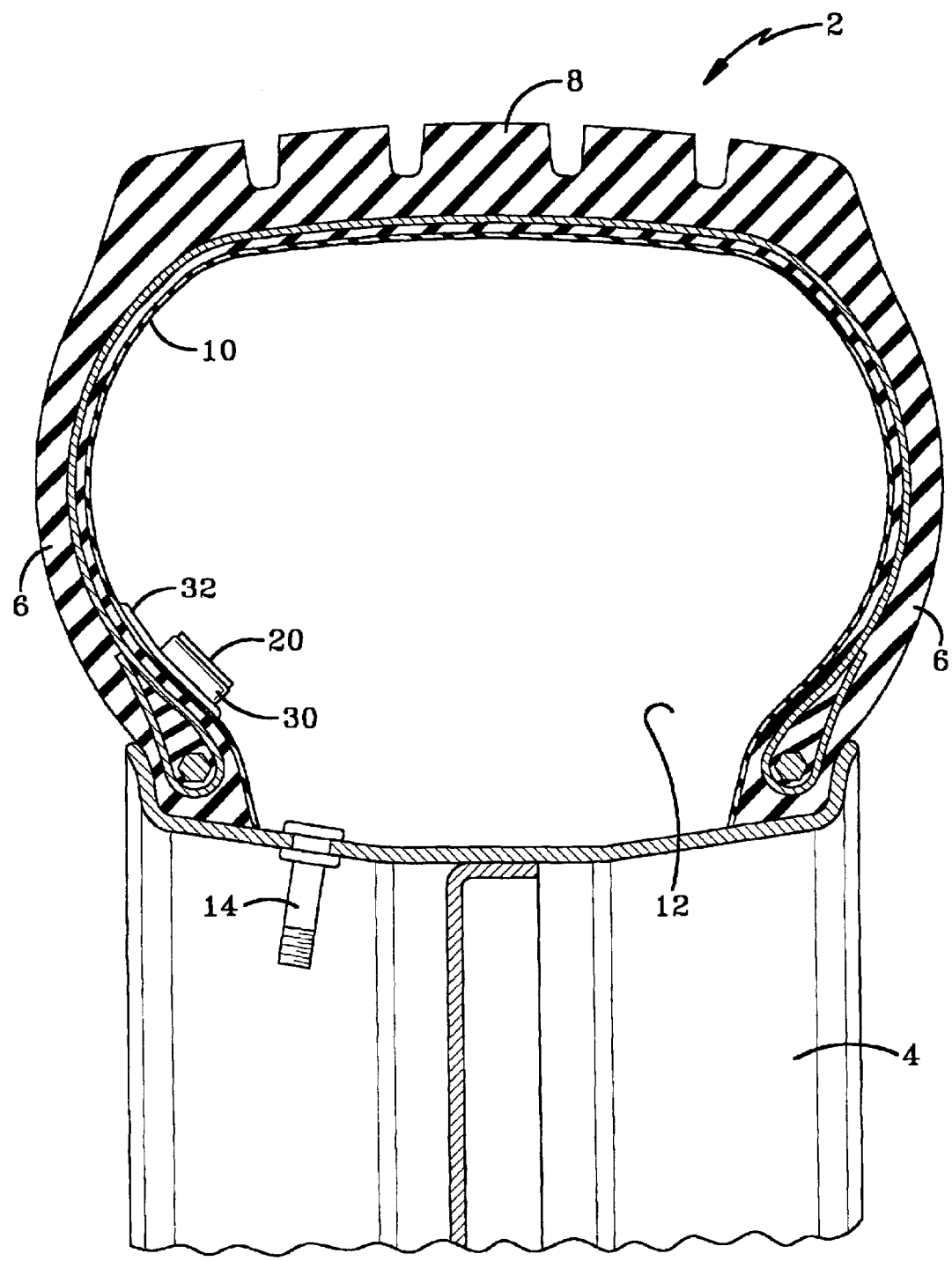
FIG. 4 is a view similar to FIG. 1 showing an alternative-mounting configuration for the label.
Figure 5:
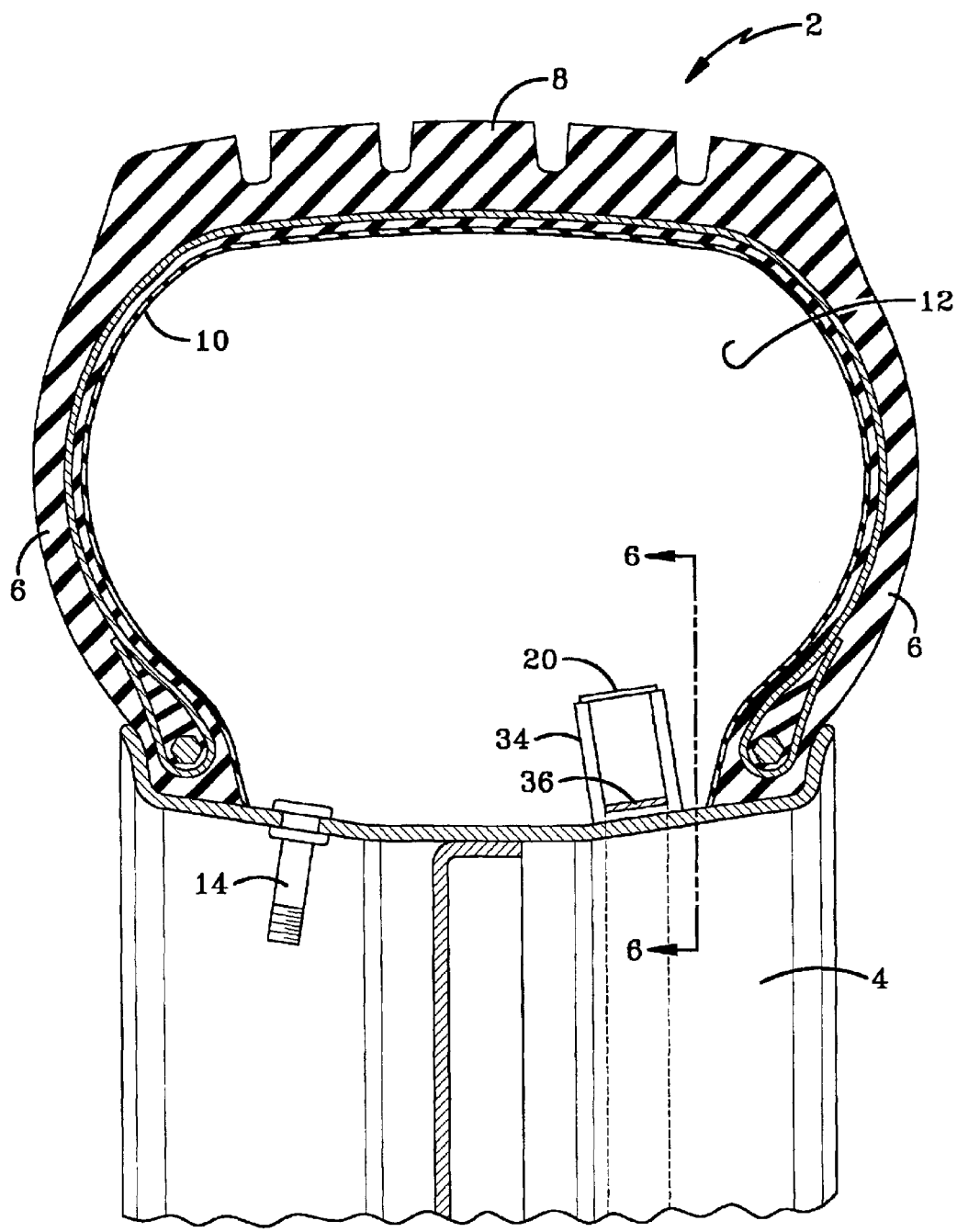
FIG. 5 is a view similar to FIG. 4 showing an alternative-mounting configuration for the label.
Figure 6:
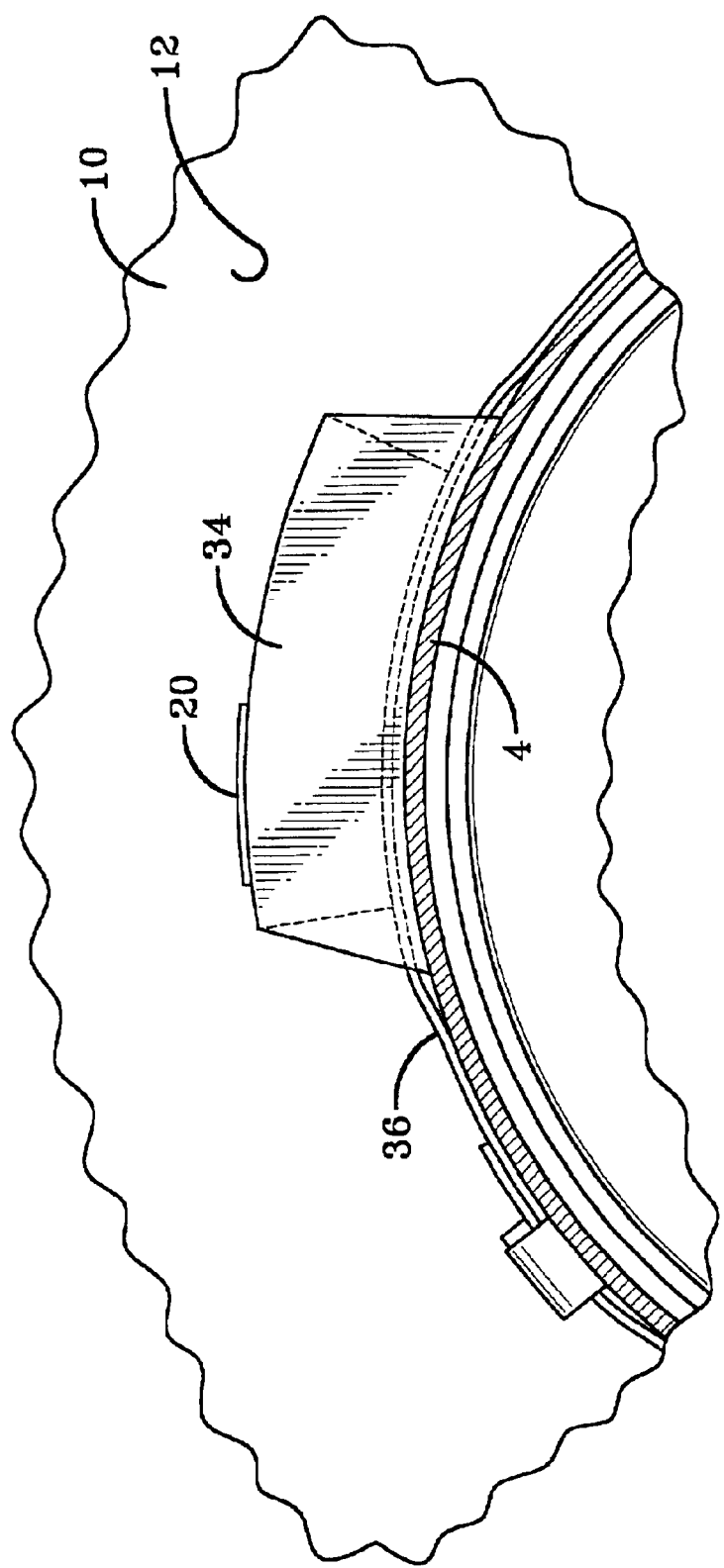
FIG. 6 is a sectional view taken along line 6—6 of FIG. 5.

FIG. 4 depicts an alternative embodiment wherein a tire-monitoring device 30 is connected to inner surface 10 of tire 2 with a patch 32 and label 20 is connected to the outer surface of monitoring device 30. FIG. 5 shows another embodiment wherein a monitoring device 34 is held on rim 4 by strap 36. Label 20 may be connected to monitoring device 34 or strap 36. In other embodiments, label 20 may be integrally formed in sidewall 6 of tire 2 or embedded within sidewall 6 of tire 2.

The method of the invention includes the step of mounting label 20; labels 20 on tire 2, rim 4, or, a monitoring device. Label 20 is mounted before tire 2 is placed into use. Tire 2 is then used on a vehicle until the tire is inspected during a maintenance check or until the tire fails.

In order to determine the maximum temperature experienced by the tire, the investigator analyzing the tire failure reviews the temperature indicated by labels 20. If the tire is still in use, the investigator can remove the tire from service if the maximum temperature indicated by label 20 exceeds a predetermined limit. If the tire has already failed, the investigator can use the temperature data to help determine a potential cause of the failure. If desired, the investigator can interpolate a temperature at a specific location by known interpolation techniques. When temperature-indicating label 20 is not connected directly to the inner surface of tire 2, the investigator can interpolate or use known data to determine a temperature at a specific location on the tire. Even if the investigator does not perform an interpolation, the labels will allow the investigator to quickly determine if an area of the tire has experienced excessive heat. Evidence of excessive heating may reveal to the investigator the type of service the tire has experienced or potentially why the tire failed.

In the foregoing description, certain terms have been used for brevity, clearness, and understanding. No unnecessary limitations are to be implied there from beyond the requirement of the prior art because such terms are used for descriptive purposes and are intended to be broadly construed.

Moreover, the description and illustration of the invention is an example and the invention is not limited to the exact details shown or described.

What is claimed is:

1. A pneumatic tire for a vehicle having an indicator that allows an investigator to identify the temperature experienced by the tire as a potential cause of a tire failure; the tire comprising:

a body having an inner surface; and an indicator carried by the inner surface of the body;

the indicator being a non-reversible temperature-indicating label having a first temperature-indicating area adapted to provide an indication when the area is exposed to a first minimum temperature and a second temperature-indicating area adapted to provide an indication when the area is exposed to a second minimum temperature.

2. The tire of claim 1, wherein each area provides a visual indication that the area has been exposed to its minimum temperature.

3. The tire of claim 1, wherein each minimum temperature is in a temperature range that will injure a tire.

4. The tire of claim 3, wherein the first minimum temperature is lower than the second minimum temperature.

5. The tire of claim 1, wherein the indicator has at least three temperature-indicating areas.

6. In combination, a pneumatic tire, a tire rim, a tire-monitoring device, and an indicator;

the pneumatic tire having a body having an inner surface;

the tire being mounted to the tire rim to define a chamber;

the tire-monitoring device being carried by one of the tire and tire rim;

an indicator carried by one of the tire, tire rim, and tire monitoring device; the indicator being exposed to the chamber defined by the tire and the rim;

the indicator being a non-reversible temperature-indicating label that allows an investigator to identify the temperature experienced by the tire as a potential cause of a tire failure by indicating if the label has been exposed to a minimum temperature.

7. The combination of claim 6, wherein the indicator has a first temperature-indicating area adapted to provide an indication when the area is exposed to a first minimum temperature and a second temperature-indicating area adapted to provide an indication when the area is exposed to a second minimum temperature.

8. The combination of claim 7, wherein the indicator has at least three temperature-indicating areas.

9. The combination of claim 7, wherein each area provides a visual indication that the area has been exposed to its given temperature.

10. The combination of claim 6, wherein each given temperature is in a temperature range that will injure a tire.

11. The combination of claim 6, wherein the indicator is carried by the tire.

12. The combination of claim 6, wherein the indicator is carried by the tire rim.

13. The combination of claim 6, wherein the indicator is carried by the tire-monitoring device.

14. The combination of claim 6, wherein the tire rim includes a value; the indicator being carried by the valve.

15. The combination of claim 6, wherein the tire-monitoring device is connected to the tire rim with a strap.

16. A method of analyzing a pneumatic tire to determine if the tire has been harmed due to exposure to excessive heat; the method comprising the steps of:

(a) applying a non-reversible, temperature-indicating label to the pneumatic tire before the tire is placed into normal use;

(b) using the tire with the label until the tire fails;

(c) after the tire has failed, reading the label to determine the temperature at least one component of the tire had been exposed to during tire use; and (d) determining if the temperature of the component could have caused the tire to fail.

17. The method of claim 16, wherein step (a) includes the step of applying a label having a first temperature-indicating area adapted to provide an indication when the area is exposed to a first minimum temperature and a second temperature-indicating area adapted to provide an indication when the area is exposed to a second minimum temperature.

18. The method of claim 16, wherein step (a) includes the step of applying a label having at least three temperature-indicating areas.

19. The method of claim 16, further comprising the steps of:

identifying the temperature of the tire area where the label is disposed; and interpolating the temperature of the tire at the area of tire failure.

20. The method of claim 16, further comprising the step of applying a second non-reversible, temperature-indicating label to the pneumatic tire before the tire is placed into normal use.

21. The method of claim 16, further comprising the steps of attaching a tire monitoring device to the tire before the tire is placed into use and attaching the non-reversible, temperature-indicating label to the tire monitoring device.

22. The method of claim 16, further comprising the step of mounting the tire to a tire rim.

23. The method of claim 22, further comprising the step of mounting the non-reversible, temperature-indicating label to the rim.

24. The method of claim 23, wherein the rim includes a valve; and further comprising the step of attaching the non-reversible, temperature-indicating label to the valve.

25. The method of claim 22, further comprising the steps of:

attaching a tire monitoring device to the rim; and attaching the non-reversible, temperature-indicating label to the tire monitoring device.

26. The method of claim 25, further comprising the step of attaching the tire-monitoring device to the rim with a strap.

27. A method of analyzing a pneumatic tire to determine if the tire has been harmed due to exposure to excessive heat; the method comprising the steps of:

(a) applying a non-reversible, temperature-indicating label to the pneumatic tire before the tire is placed into normal use;

(b) using the tire with the label;

(c) reading the label to determine the temperature that at least one component of the tire had been exposed to; and (d) determining if the temperature that the component had been exposed to is a temperature that could cause tire damage; and (e) removing the tire from operation if the temperature on the label is a temperature that would cause tire damage.

28. The method of claim 27, wherein step (a) includes the step of applying a label having a first temperature-indicating area adapted to provide an indication when the area is exposed to a first minimum temperature and a second temperature-indicating area adapted to provide an indication when the area is exposed to a second minimum temperature.

29. The method of claim 27, wherein step (a) includes the step of applying a label having at least three temperature-indicating areas.

30. The method of claim 27, further comprising the step of applying a second non-reversible, temperature-indicating label to the pneumatic tire before the tire is placed into normal use.

31. The method of claim 27, further comprising the steps of attaching a tire monitoring device to the tire before the tire is placed into use and attaching the non-reversible, temperature-indicating label to the tire monitoring device.

32. The method of claim 27, further comprising the step of mounting the tire to a tire rim.

33. The method of claim 32, further comprising the step of mounting the non-reversible, temperature-indicating label to the rim.

34. The method of claim 33, wherein the rim includes a valve; and further comprising the step of attaching the non-reversible, temperature-indicating label to the valve.

* * * * *